United States Patent
Mezhibovsky et al.

(10) Patent No.: US 10,291,781 B2
(45) Date of Patent: *May 14, 2019

(54) BEST MATCH INTERACTION SET ROUTING

(71) Applicant: GENESYS TELECOMMUNICATIONS LABORATORIES, INC., Daly City, CA (US)

(72) Inventors: Vladimir Mezhibovsky, San Francisco, CA (US); Nikolay Korolev, Concord, CA (US); Vitaliy Teryoshin, Danville, CA (US); Herbert Willi Artur Ristock, Walnut Creek, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/898,476

(22) Filed: Feb. 17, 2018

(65) Prior Publication Data

US 2018/0176379 A1 Jun. 21, 2018

Related U.S. Application Data

(63) Continuation of application No. 13/681,417, filed on Nov. 19, 2012, now Pat. No. 9,900,435.

(51) Int. Cl.
*H04M 3/523* (2006.01)
*H04M 3/51* (2006.01)

(52) U.S. Cl.
CPC ....... *H04M 3/5232* (2013.01); *H04M 3/5141* (2013.01); *H04M 3/523* (2013.01); *H04M 3/5233* (2013.01)

(58) Field of Classification Search
CPC .................. H04M 3/5233; H04M 3/523
USPC ........... 379/265.01, 265.02, 265.06, 265.12, 379/265.13, 266.01
See application file for complete search history.

(56) References Cited

U.S. PATENT DOCUMENTS

| | | | |
|---|---|---|---|
| 5,903,641 A | 5/1999 | Tonisson | |
| 7,831,033 B2 * | 11/2010 | Dezonno | H04M 3/5232 379/265.01 |
| 2005/0008139 A1 * | 1/2005 | Beckstrom et al. | 379/265.01 |
| 2006/0153356 A1 | 7/2006 | Sisselman et al. | |
| 2007/0150404 A1 * | 6/2007 | Golle | 705/37 |
| 2009/0190744 A1 * | 7/2009 | Xie et al. | 379/265.11 |
| 2012/0057691 A1 | 3/2012 | Moran et al. | |

(Continued)

OTHER PUBLICATIONS

Bertsekas, Dimitri P., et al., A Forward/Reverse Auction Algorithm for Asymmetric Assignment Problems, Computational Optimization and Applications, pp. 1, 277-297, 1992, Kluwer Academic Publishers, Netherlands.

(Continued)

*Primary Examiner* — Nafiz E Hoque

(57) ABSTRACT

A method for routing activities in a contact center to contact center agents includes: concurrently selecting, by a processor, N activities, wherein N is an integer greater than 1; concurrently identifying, by the processor, N contact center agents; identifying, by the processor, one or more sets of preferences associated with the N activities and the N contact center agents; matching, by the processor, the N activities and the N contact center agents based on the one or more sets of preferences; and routing, by the processor, one or more of the N activities to the matched contact center agents.

18 Claims, 13 Drawing Sheets

(56) References Cited

U.S. PATENT DOCUMENTS

2012/0321072 A1  12/2012  Dooley et al.

OTHER PUBLICATIONS

Bertsekas, Dimitri P., et al., A Forward/Reverse Auction Algorithm for Asymmetric Assignment Problems, Jan. 1993, pp. 1-21.
U.S. Office Action, dated Jul. 22, 2013, for U.S. Appl. No. 13/681,420, 11 pages.

* cited by examiner

Preferences

Agent Name: John Doe
ID: 123456789

Media Type  [Select one... ▶]
- ● Incoming
- ○ Outgoing
- Capacity [3]
- Time Period [▶]

○ Voice Call
  ○ Video Call
  ○ Email
  ● Chat
  ○ Web App
  ○ None
  — 704

Service Type [Select one...]
- ○ Incoming
- ○ Outgoing
- Capacity [1]
- Time Period [▶]

[Cancel]  [Save]

|    | A1  | A2  | A3  | A4  | A5  |
|----|-----|-----|-----|-----|-----|
| I1 |     |     | 2/2 |     |     |
| I2 |     |     |     |     | 2/1 |
| I3 | 1/5 |     |     |     |     |
| I4 |     | 2/3 |     |     |     |
| I5 |     |     |     | 1/5 |     |

|    | I1  | I2  | I3  | I4  | I5  |
|----|-----|-----|-----|-----|-----|
| A1 | 2/5 |     |     |     |     |
| A2 |     |     | 2/3 |     |     |
| A3 |     |     |     |     | 1/2 |
| A4 |     |     |     | 2/3 |     |
| A5 |     | 1/2 |     |     |     |

FIG. 9A

| | A1 | A2 | A3 | A4 | A5 | A6 | A7 | A8 |
|---|---|---|---|---|---|---|---|---|
| I1 | | | | | 1/5 | | | |
| I2 | | | 2/4 | | | | | |
| I3 | | | | | | | | 1/6 |
| I4 | | | | | | 6/5 | | |
| I5 | | | | | | | 1/2 | |
| I6 | 1/4 | | | | | | | |
| I7 | | 1/5 | | | | | | |
| I8 | | | | 3/1 | | | | |

| | I1 | I2 | I3 | I4 | I5 | I6 | I7 | I8 |
|---|---|---|---|---|---|---|---|---|
| A1 | | | | | 1/4 | | | |
| A2 | | | 3/6 | | | | | |
| A3 | 1/8 | | | | | | | |
| A4 | | | | | | | | 1/3 |
| A5 | | | | | | 1/4 | | |
| A6 | | 1/8 | | | | | | |
| A7 | | | | | | | 1/3 | |
| A8 | | | | 2/7 | | | | |

FIG. 9B

BEST MATCH INTERACTION SET ROUTING

CROSS-REFERENCE TO RELATED APPLICATIONS

This application is a continuation of U.S. patent application Ser. No. 13/681,417, filed on Nov. 19, 2012, now U.S. Pat. No. 9,900,435, the content of which is incorporated herein by reference.

FIELD

Embodiments of the present invention are directed to systems and methods for operating contact centers and, more particularly, to systems and methods for routing activities to particular customer service agents based on agent preference information.

BACKGROUND

Contact centers are generally employed by businesses to communicate with their current or potential customers (collectively referred to as customers or end users). Contact centers often employ business representatives, or agents, who are assigned to various incoming and outgoing activities associated with such customers. Incoming activities may include servicing the needs of calling customers, while outgoing activities may include proactively contacting the customers for offering products, conducting surveys, or rendering other services to those customers. An agent may also be engaged in offline activities, which may be referred to as "back office work," such as completing forms, answering emails, answering letters, taking part in training sessions, or performing other activities that do not involve a real-time interaction with a customer.

Traditional ways for customers and agents to communicate with one another is by telephone, fax, or email. However, recent technological developments have extended the channels of communication to other media such as, for example chat, instant messaging, social networking sites, and the like.

In some contact centers, an incoming or outgoing activity may be assigned to an available agent who is capable of handling the activity as determined, for example, by the agent's level of skill in the related field. In current contact centers, agents are often assigned skills (e.g. based on training they may have received), which may be administratively activated or deactivated to control what activities an agent will handle at any point in time. In addition, contact center administrators or work force management software may establish schedules for each agent based on different criteria such as, for example, labor laws, employment agreements, scheduled vacation times, contact center hours of operation, and the like. The schedules may indicate, for example, the types of activity an agent is to handle and the agent's capacity. With respect to the agent's capacity, the schedule may indicate a number of activities or types of activities that an agent may be assigned to handle concurrently at any point in time.

A contact center administrator may modify an agent's skill or capacity settings and potentially change the agent's utilization during routing of activities. It is desirable to provide similar abilities to an agent. In this regard, it is desirable to provide to an agent the ability to influence his/her utilization in real time during the routing of activities.

Accordingly, what is desired is a system and method for providing to agents engaged in customer activities the ability to express their own preferences with regards to the type of activities they would like to handle, capacity for handling activities, and/or other routing parameters, in real-time.

SUMMARY

According to some embodiments, a method for routing a plurality of activities to a plurality of contact center agents includes: concurrently selecting, by a processor, N activities, wherein N is an integer greater than 1; concurrently identifying, by the processor, N contact center agents; identifying, by the processor, one or more sets of preferences associated with the N activities and the N contact center agents; matching, by the processor, the N activities and the N contact center agents based on the one or more sets of preferences; and routing, by the processor, one or more of the N activities to the matched contact center agents.

The set of preferences associated with the agents are based on one or more parameters including skill, predicted agent availability, agent upsell ability, agent cross-sell ability, and individual preferences.

The set of preferences associated with the activities are based on one or more parameters including service type, requested skill set, service level agreement, customer satisfaction.

The matching includes using an algorithm based on the Gale-Shapley algorithm.

The matching is performed by giving priority to the set of preferences associated with the N activities.

The matching is performed by giving priority to the set of preferences associated with the N agents.

The Gale-Shapley algorithm is adjusted to accommodate for an agent surplus.

The Gale-Shapley algorithm is adjusted to accommodate for an activity surplus.

The matching includes using an algorithm based on an auction algorithm.

According to some embodiments, a server for routing a plurality of activities to a plurality of contact center agents including a processor and a memory, wherein the memory has stored thereon instructions that, when executed by the processor, cause the processor to: concurrently select, N activities, wherein N is an integer greater than 1; concurrently identify N contact center agents; identify one or more sets of preferences associated with the N activities and the N contact center agents; match the N activities and the N contact center agents based on the one or more sets of preferences; and route one or more of the N activities to the matched contact center agents.

The server of claim 10, wherein the one or more sets of preferences associated with the contact center agents identify agent skills, predicted agent availability, agent upsell ability, agent cross-sell ability, or individual agent preferences.

The one or more sets of preferences associated with the activities identify service type, skill set, service level agreement, or customer satisfaction.

The matching is based on the Gale-Shapley algorithm.

The instructions further cause the processor to assign priority to the one or more sets of preferences associated with the N activities.

The instructions further cause the processor to assign priority to the one or more set of preferences associated with the N agents.

The N contact center agents are selected from a group of M eligible agents, wherein M is an integer greater than N.

The N activities are selected from a group of M pending activities, wherein M is an integer greater than N.

The matching is based on auctioning the N contact center agents or activities.

As a person of skill in the art will appreciate, allowing agents to express their preferences in real time may help to positively influence the quality of the service provided by the agents, which in turn, and may improve contact center operations and positively impact the business supported by the contact center.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIG. 7 is a conceptual layout diagram of a graphical user interface displayed by an agent device for viewing and editing agent preference information, according to some exemplary embodiment of the invention;

FIG. 9A is a table providing a visualization of the optimal matched [I, A] and [A, I] from the perspective of the activities and agents, respectively, according to one embodiment of the invention; and FIG. 9B is a table providing a visualization of the optimal matches [I, A] and [A, I] from the perspective activities and agents, respectively, according to one embodiment of the invention.

DETAILED DESCRIPTION

Figure 1:
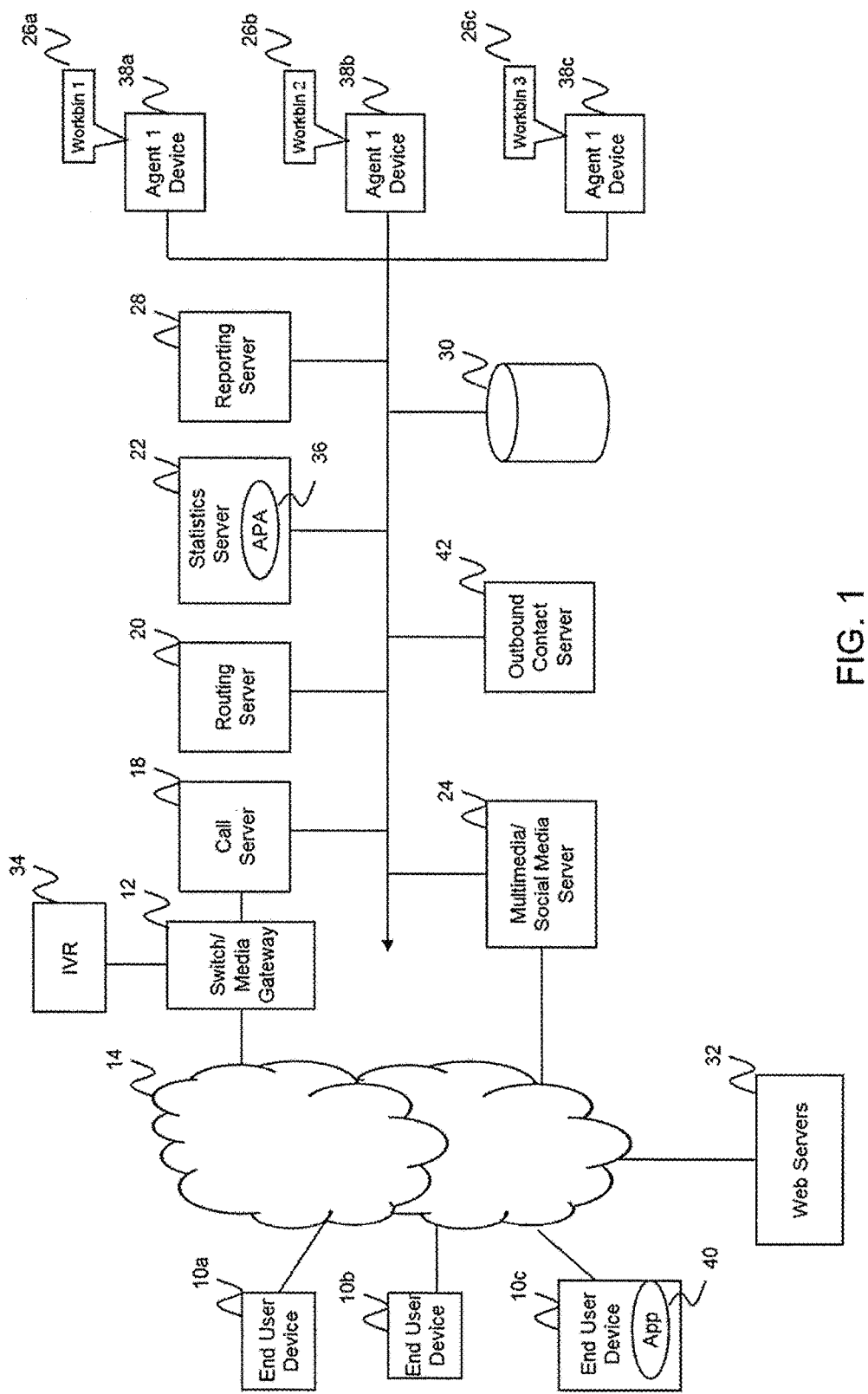
FIG. 1 is a schematic block diagram of a system supporting a contact center that is configured to route incoming and outgoing customer activity to customer service agents based on agents' preferences, among other factors, according to some exemplary embodiments.

In the following detailed description, only certain exemplary embodiments of the present invention are shown and described, by way of illustration. As those skilled in the art would recognize, the invention may be implemented in many different forms and should not be construed as being limited to the embodiments set forth herein. Like reference numerals designate like elements throughout the specification.

Embodiments of the present invention are directed to a system and method for routing inbound and outbound activities to agents of a contact center that takes into account agent preferences among other factors.

Enabling an agent to actively express his/her current preferences and taking them into account as "soft" or flexible attributes (in contrast to administratively set "hard" or rigid attributes) within a current routing strategy may, for example, increase an agent's job satisfaction and positively impact the quality of the contact center's services. While an agent may inform a contact center administrator about his/her preferences and the administrator may adjust the agent's assigned skills and/or capacity settings accordingly (thus, effectively merging hard and soft attributes), facilitating the agent's expression of his/her preferences in real-time, potentially with frequent dynamic changes, provides many advantages that may help to improve a contact center's routing strategy. For example, according to embodiments of the present invention, real-time routing of customer actions to agents may become more reflective of an agent's current preferences. Furthermore, keeping hard and soft attributes separate allows the soft attributes to be disregarded based on actual operation conditions.

FIG. 1 is a schematic block diagram of a system supporting a contact center that is configured to route incoming and outgoing customer activities to customer service agents based on agents' preferences, among other factors, according to some exemplary embodiments. The contact center may be an in-house facility to a business or corporation for serving the enterprise in performing the functions of sales and service relative to the products and services available through the enterprise. In another aspect, the contact center may be a third-party service provider. The contact center may be hosted in equipment dedicated to the enterprise or third-party service provider, and/or hosted in a remote computing environment such as, for example, a private or public cloud environment with infrastructure for supporting multiple contact centers for multiple enterprises.

According to some exemplary embodiments, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users desiring to receive services from the contact center may initiate inbound interactions with the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound interactions from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, and/or any 3G or 4G network conventional in the art.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. In this regard, the switch 12 may include an automatic call distributor, a private branch exchange (PBX), an IP-based software switch, and/or any other switch configured to receive Internet-sourced calls and/or telephone network-sourced calls. According to one 29exemplary embodiment of the invention, the switch is coupled to a call server 18 which may, for example, serve as an adapter or interface between the switch and the remainder of the routing, monitoring, and other call-handling systems of the contact center.

The contact center may also include a multimedia/social media server 24 for engaging in media interactions other than voice interactions with the end user devices 10 and/or web servers 32. The media interactions may be related, for example, to email, vmail (voice mail through email), chat, video, text-messaging, web, social media, screen-sharing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to some exemplary embodiments of the invention, the switch is coupled to an interactive voice response (IVR) server 34. The IVR server 34 is configured, for example, with an IVR script for querying customers on their needs. For example, a contact center for a bank may tell callers, via the IVR script, to "press 1" if they wish to get an account balance. If this is the case, through continued interaction with the IVR, customers may complete service without needing to speak with an agent.

If the incoming interaction, henceforth referred to as incoming customer activity (an activity includes interactions as well as tasks that do not involve any real-time interaction with a customer), is to be routed to an agent, the call server 18 will interacts with a routing server 20 for finding the most appropriate agent for processing the incoming activity. The call server 18 may be configured to process PSTN calls, VoIP calls, and the like. For example, the call server 18 may include a session initiation protocol (SIP) server for processing SIP calls. According to some exemplary embodiments, the call server 18 may, for example, extract data about the customer interaction such as dialed telephone number, often known as the automatic number identification (ANI) number, or the customer's internet protocol (IP) address, or email address.

In some embodiments, the call server 18 may also query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL Server, Microsoft Access, PostgreSQL, MySQL, FoxPro, and SQLite, and may be stored in a mass storage device 30. The call server 18 may query the customer information from the customer database via an ANI or any other information collected by the IVR 34. The information may then be relayed to the agent device 38 of the agent who is processing the call.

In one example, while an agent is being located and until such agent becomes available, the call server 18 may place an incoming customer activity in, for example, a customer activity queue. The activity queue may be implemented via any data structure conventional in the art, such as, for example, a linked list, array, and/or the like. The data structure may be maintained, for example, in buffer memory provided by the call server 18.

Once an appropriate agent is available to handle a customer activity, the activity may be removed from the customer activity queue and transferred to a corresponding agent device 38a-38c (collectively referenced as 38). Collected information about the customer and/or the customer's historical information from the customer database may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations and for interfacing with customers via a variety of communication mechanisms such as chat, instant messaging, voice calls, and the like The selection of an appropriate agent for routing an inbound or outbound customer activity may be based, for example, on a routing strategy employed by the routing server 20, and based on information about agent availability, skills, preferences, and other routing parameters provided, for example, by a statistics server 22. According to some embodiments, the statistics server 22 includes an agent preference aggregator (APA) module 36 configured to monitor the agents' preference settings and update preference records stored on, for example, the mass storage device 30, when changes in the preference settings are detected. Monitoring the agents' preference settings in real time allows the routing server 20 to access the most current preference information that it may use in making a routing decision. The APA module 36 may be a software module implemented via computer program instructions which are stored in memory of the statistics server 22, and which program instructions are executed by a processor. A person of skill in the art should recognize that the APA module 36 may also be implemented via firmware (e.g. an application-specific integrated circuit), hardware, or a combination of software, firmware, and hardware. The APA module may also be deployed in a separate application server and is not limited to being deployed in the statistics server.

According to some exemplary embodiments, the multimedia/social media server 24 may be configured to detect user presence on different websites including social media sites, and may also be configured to monitor and track interactions on those websites.

The multimedia/social media server 24 may also be configured to provide, to an end user, a mobile application 40 for downloading onto the end user device 10. The mobile application 40 may provide user configurable settings that indicate, for example, whether the user is available, not available, or availability is unknown, for purposes of being contacted by a contact center agent. The multimedia/social media server 24 may monitor the status settings and send updates to the aggregation module each time the status information changes.

The contact center may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to some exemplary embodiments of the invention, the routing server 20 is enhanced with functionality for managing back-office/offline activities that are assigned to the agents. Once assigned to an agent, an activity may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to some exemplary embodiments, in addition to storing agent preference data, the mass storage device 30 also stores data related to contact center operation such as, for example, information related to agents, customers, customer activities, and the like. The mass storage device may take form of a hard disk or disk array as is conventional in the art.

According to some exemplary embodiments, the system also includes an outgoing contact server (OCS) 42 for scheduling, initiating, and/or managing, outgoing interactions. For example, the OCS may store an outgoing contact list and may interface with the routing server 20 to enable an agent to partake in an outgoing activity to, for example, upsell current customers, solicit new businesses, seek donations for charitable organizations, or reach out to customers who have requested technical assistance. According to some embodiments, the OCS 42 may further interact with the IVR 34 for placing outgoing calls.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art will recognize that the functionality of various servers may be combined or integrated into a single server, or the functionality of a particular server may be distributed across one or more other servers without departing from the scope of the embodiments of the present invention.

Figure 2A:
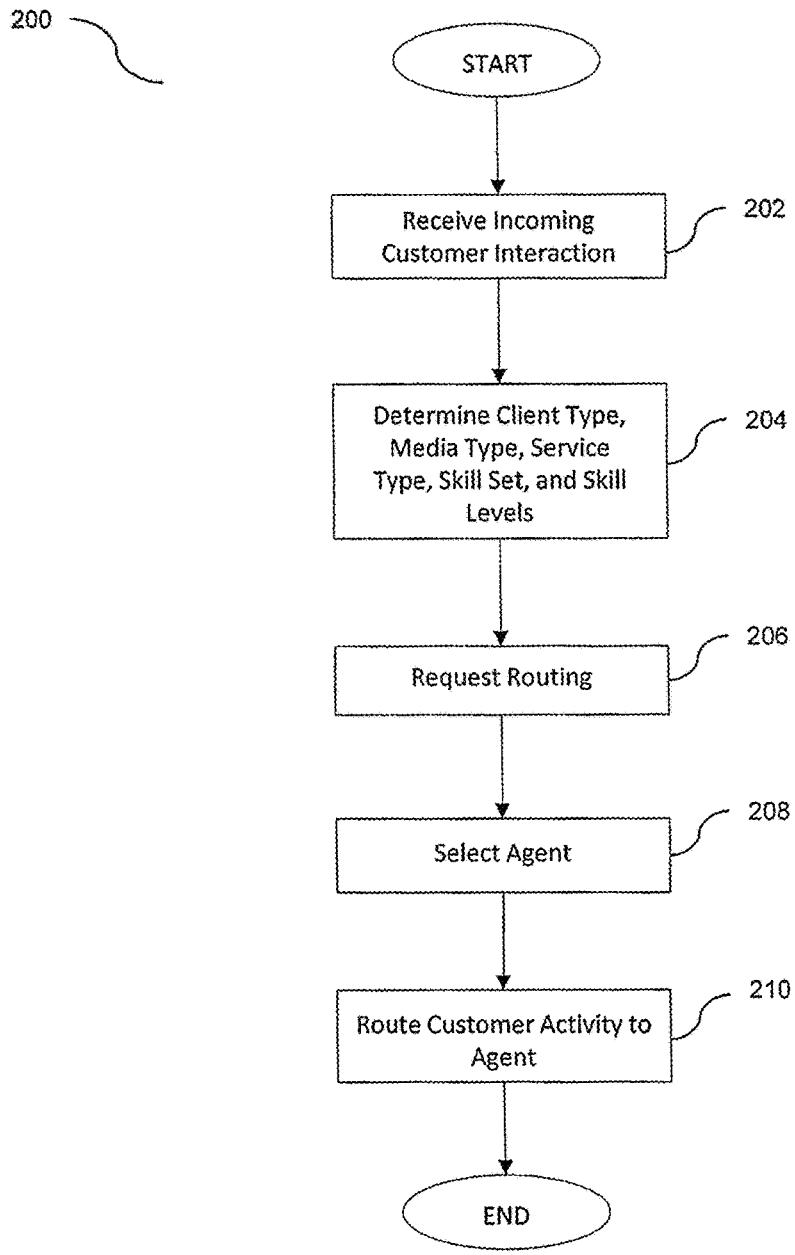
FIG. 2a is a flow diagram of a preliminary process 200 executed by the routing server 20 for assigning an incoming customer activity to an agent, according to some exemplary embodiments.

FIG. 2a is a flow diagram of an exemplary process 200 executed by the routing server 20 for assigning an incoming customer activity (also referred to as an incoming customer contact) to an agent, according to some exemplary embodiments. This and other following processes may be described in terms of a software routine executed by one or more processors based on computer program instructions stored in memory. A person of skill in the art will recognize, however, that the process may be executed via hardware, firmware (e.g. via an ASIC), or in combination of software, firmware, and/or hardware. Furthermore, the sequence of steps of the process is not fixed, but may be altered into any desired sequence as recognized by a person of skill in the art.

Also, a person of ordinary skill in the art will recognize that while process 200 pertains to an incoming customer activity, a similar process may be invoked for outbound contacts initiated by the contact center. According to some embodiments, the outbound contact is initiated by the outbound contact server 42.

In step 202, a customer contacts the contact center via the end user device 10. The customer may initiate the contact by, for example, dialing a toll-free number (e.g. a "1-800" number), starting a chat session via a chat box or window integrated into a web page, or invoking any other real-time media interaction conventional in the art. In the event of a telephony call, the customer contact is received by the switch/media gateway 12 (also referred to as a route point).

In step 204, based on data identified by the call server 18, the routing server 20 identifies, for example, a service type, client type, and/or media type corresponding to the incoming customer activity, as well as, if appropriate, an agent skill set and skill levels desired for handling the activity.

In some aspects, the routing server 20 identifies the client type corresponding to the customer based on the data extracted by the call server 18, such as, for example, the dialed telephone number (DN), and/or the customer's calling number (e.g. based on an automatic number identification (ANI)), IP address, or email address. In another aspect, the call server 18 may further use information collected by the IVR server 34 to identify the client type. In some embodiments, the call server 18 may use the extracted data to query the mass storage device 30 for customer record information. If such a record exists, the call server 18 retrieves the customer status data, which, for example, may indicate a "Gold," "Silver," or "Bronze" status. The customer record may further include information on service requirements agreed to with the customer in a customer service level agreement (SLA). The SLA may specify, for example, an upper bound on the acceptable average delay by the contact center in responding to calls from the customer, a minimum agent skill level for handling calls from the customer for particular types of services, and the like. According to some exemplary embodiments, customer status information, either alone or together with any existing SLA requirements, may define the client type of the customer.

The call server 18 may also identify the media type used by the customer in making an inbound contact. The contact center may be configured to recognize many different media types including, for example, voice, voice over internet protocol (VoIP), fax, email, vmail (voice mail through email), smail (electronic mail transport system), short message system (SMS) message, chat, video, web browser, interactive whiteboard (IWB), app share media, and the like.

The routing server 20 may identify the service type corresponding to the customer activity based on information collected by the IVR module 34 or a similar automated response system. For example, the IVR 34 may direct a calling customer to press '1' for billing and '2' for mortgage related inquiries. In the case of a bank contact center, "billing" and "mortgage" may constitute two different service types. Other service types for a bank may include "new account" and "fraud prevention," and service types for an airline contact center may include "reservations," "transfers," and "refunds." Those of ordinary skill in the art will appreciate that service types are client specific and will vary greatly from one contact center to another.

In some exemplary embodiments, each service type is associated with a corresponding skill set. A skill set includes one or more skills, and a skill level for each of the skills in the skill set. According to one example, each skill set represents a subset of a collection of skills that are administratively assigned to the agents of a contact center. An agent skill type may, for example, include language skills (e.g. Spanish, English, Japanese, etc.), skills for handling particular service requests (e.g. requests for mortgage, flight reservations, returns, etc.), skills for handling certain types of interactions (e.g. chat, social media, browser-based calls, etc.), and the like. For example, an agent may acquire skills based on completing a training program or a certification process. Agent skill levels may, for example, be represented numerically (such as an integer between one and ten), descriptively via text (such as "low", "medium", and "high," or "novice" and "proficient"), or via any other mechanism conventional in the art.

The client type, media type, service type, skill set, and skill levels associated with each customer activity, along with any other information that may be collected by the IVR server 34 or by any other mechanism, is henceforth referred to as customer activity data. Of course, a person of ordinary skill in the art will recognize that in the case of an outgoing customer activity, the customer activity data encompasses information pertaining to the outgoing customer activity.

In step 206, the call server 18 sends a request to the routing server 20 to route the incoming customer contact to an available agent.

A person of ordinary skill in the art will recognize that while steps 204 and 206 assume that the call server 18 receives the incoming interaction ahead of the routing server 20, in other embodiments, the order may be reversed. For example, in some embodiments, the routing server 20 may initiate the routing procedure which may begin with the process outlined in step 204.

In step 208, the routing server 20 invokes the appropriate routing strategy and applies customer activity data gathered until that point, as well as each agent's administrative settings and preferences, for selecting an appropriate agent to whom to route the activity.

In step 210, the routing server 20 routes the incoming activity to the selected agent.

Figure 2B:
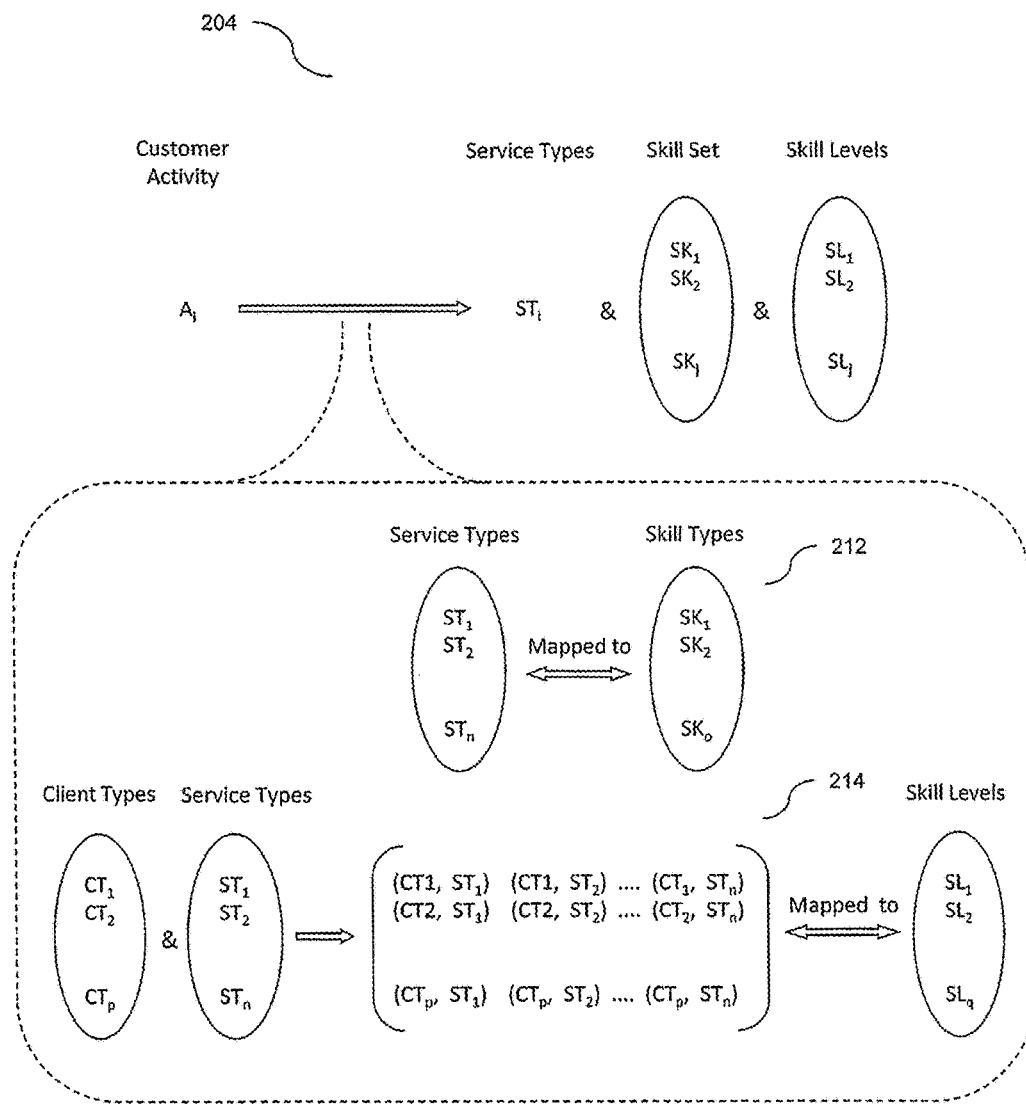
FIG. 2b is a conceptual layout diagram detailing the correspondence between service types and skill types, and the correspondence between skill levels and the combination of client types and service types, according to some exemplary embodiments.

FIG. 2b is a conceptual layout diagram detailing the correspondence between service types and skill types, and the correspondence between skill levels and the combination of client types and service types, according to some exemplary embodiments. Once the service type and the client type corresponding to the customer activity are identified (e.g. by the routing server 20), the skill types and their associated skill levels may be readily identified based upon correspondences 212 and 214. Those of skill in the art will recognize that one particular service type may be associated with one or more agent skills. The skill level derived from correspondence 214 may, for example, represent the desired agent skill level for proper handling of the particular customer activity.

Figure 3:
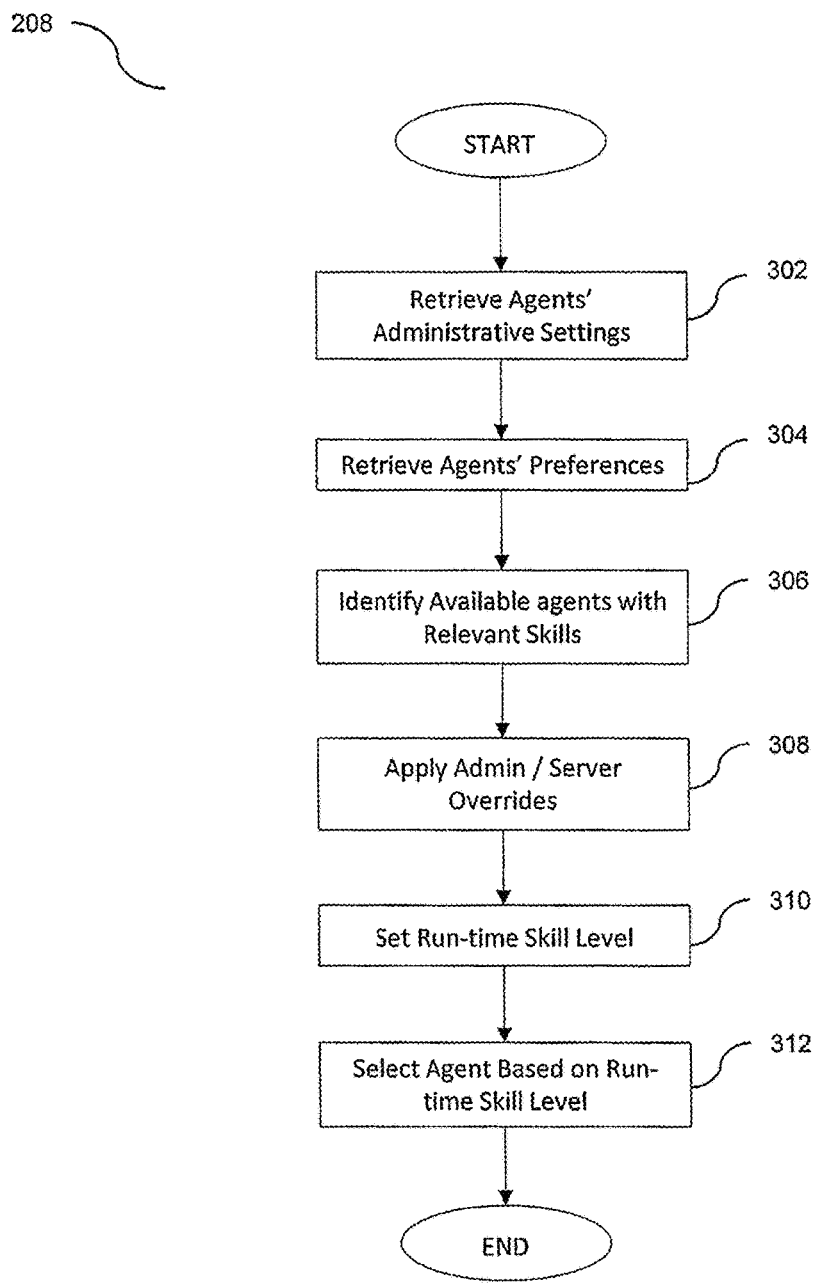
FIG. 3 is a flow diagram of a process for identifying an agent to whom a customer activity is routed, according to some exemplary embodiments.

FIG. 3 is a more detailed flow diagram of step 208 of FIG. 2a for identifying an agent to whom a customer activity is routed, according to some exemplary embodiments.

In step 302, the routing server 20 retrieves administrative settings for eligible agents from the mass storage device 30. The eligible agents may be, for example, those who are logged in as being engaged in, or ready to be engaged in, the activities of the contact center. According to some embodiments, an administrator assigns to each agent a particular skill set (including specific skills and skill levels) and determines each agent's capacity settings, which are indicative of interactions of a specific media type, service type, direction type (e.g. inbound or outbound activity), or a combination thereof, that may be concurrently handled by the agent. An administrator may be able to assign and adjust these and other parameters via a graphical user interface accessible through the agent device 38. Some of the administrative settings may be assigned, for example, when the agent is first configured. The administrative settings may also be updated when an administrator deems it appropriate to do so based on, for example, feedback from the agent or the agent's work experience and/or performance. An agent's completion of a certification process or training program qualifying the agent for assignment to new skills may also prompt such change. According to some embodiments, the routing server 20 may obtain a list of eligible agents from the statistics server 22.

In step 304, the routing server 20 retrieves the individual preferences of one or more agents. In this regard, the agent preference aggregator 26 monitors the preferences of the agents and updates the preference records in response to an agent updating his/her preferences. According to some embodiments, the agent may update his/her preference setting by using a user input device, such as a keyboard and/or mouse. For example, in some embodiments, an agent may be presented via a monitor coupled to the agent device 38, a list of activities pending in one or more queues, and may be permitted to express a positive or negative preference for any of the activities. An activity may be, for example, to respond to a mortgage related call, an email requesting technical support, a request for a callback, or the like. In some embodiments, the agent may be able express a positive or negative preference with regard to different service types, skill types, media types, client types, or a combination thereof. The agent's positive or negative preference may be indicated via any text, numeric value, graphic, and/or other audio/visual mechanism conventional in the art. For example, the agent's preference may be indicated numerically, such as, for example, as an integer between −10 and +10 (or via other values). The agent's preference may also be indicated by ranking various activities, skill types, service types, media types, and/or client types.

According to another aspect, the agent may also set preferences with regards to capacity for handling activities of a particular media type, service type, and/or direction type by, for example, specifying a number of such concurrent activities that are desired (e.g. "one technical support call," "two simultaneous chats," "three simultaneous mortgage emails," "two chats and one email," etc.). According to some embodiments, the agent may be able to restrict all or a subset of the preferences described above to a particular time period. For example, an agent may indicate a positive preference for technical assistance calls in the morning and a negative preference for such calls in the afternoon, or specify a capacity for "two simultaneous chats" in the morning and "only one active chat session at a time" from 2:00 pm to 3:00 pm. An agent may be motivated to set or modify preferences for a number of reasons, some of which could include, for example, the agent's current mood, the agent's desire to get more experience in a certain area, the agent's desire to work on matters different from those he or she is currently servicing, and the like. This gives agents some control over the type of work that they are handling at any given time.

In step 306, the routing server 20, based on information provided for example by the statistics server 22, identifies eligible agents to whom the customer activity may be routed. From the eligible agents, the routing server 20 may select those agents who have the skill set appropriate for handling the particular customer activity as determined via the skill mapping performed in step 300. The routing server 20 may further use the administratively set capacity settings for each of the selected agents to determine which agent has the capacity to take on the customer activity. For illustration purposes, it is assumed that a Spanish speaking customer has emailed the contact center regarding a mortgage inquiry. It is further assumed that agent A has Spanish and Mortgage skills and has an administratively set capacity for concurrently handling three emails. It is assumed that agent A is currently only working on two emails. In this example scenario, the routing server 20 is configured to recognize agent A as having skills that correspond to the customer's activity. Furthermore, because the agent's capacity has not been exhausted, the routing server is configured to identify agent A as an available agent.

In step 308, the routing server 20 determines whether or not to apply server overrides and/or any existing administrative overrides to each of the available agents' preferences, and proceeds to apply any such server and/or administrative overrides to cause the ignoring of agent specified preferences that may adversely affect routing performance.

In step 310, the routing server 20 calculates run-time skill levels for each available agent based on the administrative settings for the agent and the vetted agent preferences, according to some exemplary embodiments. The run-time skill level may be, for example, a temporary skill level that is active for routing a current activity, but which may not affect the administratively set skill levels.

In step 312, the routing server 20 selects an appropriate agent to handle the customer activity based on, among other factors, the agent's administratively set skill set, run-time skill level, and capacity.

While according to one example, the administrative and/or server overrides of step 308 are performed before the agent selection of step 312, in some exemplary embodiments, administrative and/or server overrides may be not be applied as a separate preceding step. For example, the routing server 20 may not consider administrative and/or server overrides at all, or consider the overrides, in step 312, concurrently with the run-time skill level along with other parameters such as, for example, run-time capacity determinations, to formulate an agent assignment decision. In embodiments where agent preference information includes agent capacity, a person of skill in the art will recognize the appropriate modifications to the process described with respect to step 208 to take into account capacity preferences as well.

Figure 4:
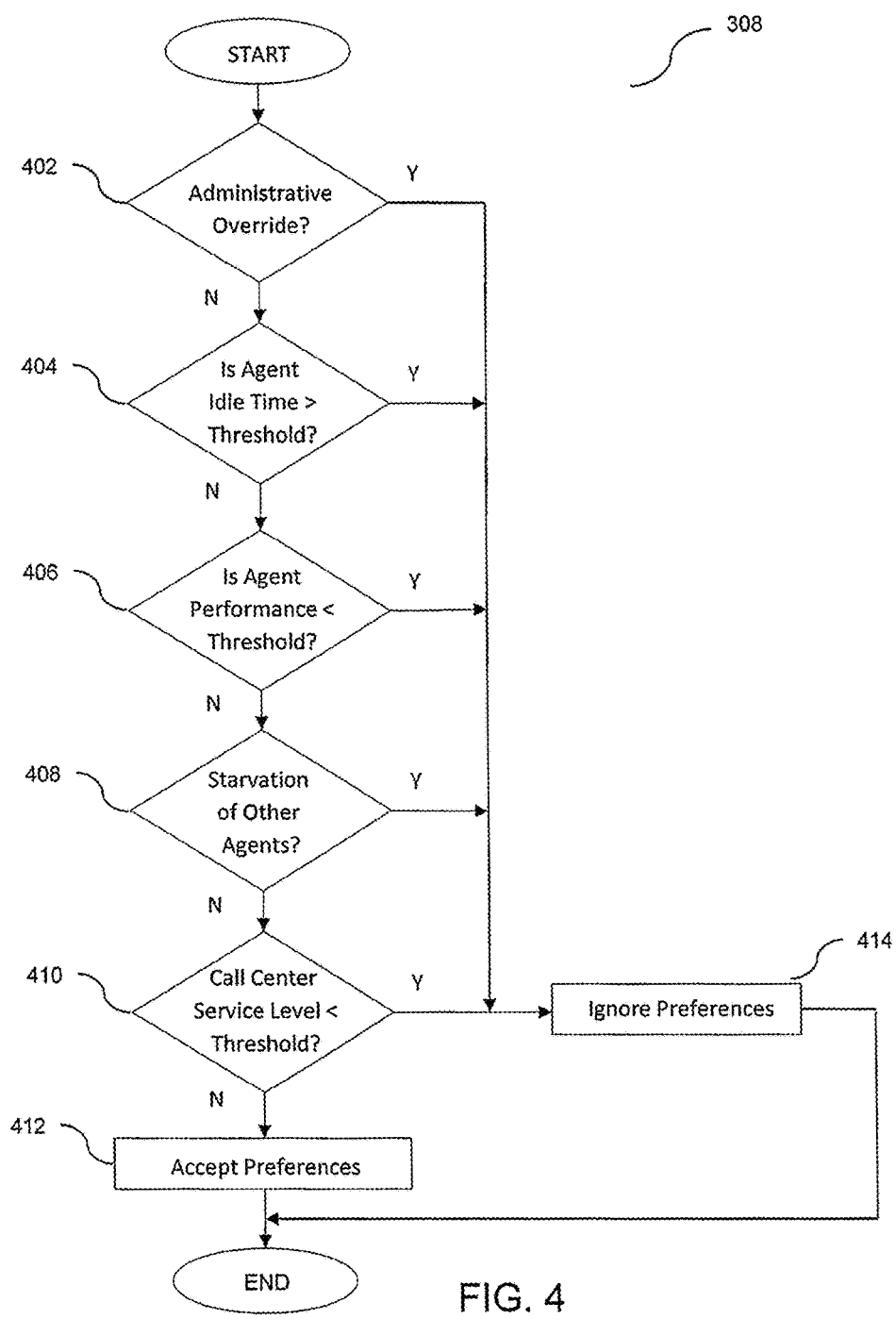
FIG. 4 is a flow diagram of a process for overriding an agent preference setting with regard to a particular activity, according to some exemplary embodiments.

FIG. 4 is a more detailed flow diagram of step 308 of FIG. 3 for overriding an agent preference setting with regard to a particular activity, according to some exemplary embodiments. The process may be implemented, for example, by an override module stored as program instructions in the memory of the routing server 20. Those of ordinary skill in the art will appreciate that the process outlined in FIG. 4 may easily be altered to consider preference settings for skill types, service types, client types, and/or other parameters associated with an activity.

In one exemplary embodiment, the process 308 of FIG. 4 may be executed at preset intervals. The override process may, in addition to or in lieu of such preset intervals, also be triggered by a number of events such as an agent modifying a preference setting, an administrator applying a new override or modifying an existing preference override, or the like. According to some embodiments, if the process of FIG. 4 is triggered by an event other than a message or command from the routing server 20 as part of the process described with respect to step 208 of FIGS. 2 and 3, an agent's preference data is retrieved prior to invoking the process of FIG. 4.

The process starts and in step 402, the override module determines whether an administrator override exists and, if so, applies the override to the agent preference settings. The administrator may, for example, statically (e.g. at preset times) or dynamically (e.g. in real-time) override all of the agent's preference settings or a subset thereof. In some exemplary embodiments, an administrator override may prompt the routing server to ignore all or a subset of an agent's preference settings.

In some exemplary embodiments not illustrated in FIG. 4, the administrator may have the ability to modify an agent's preference settings, effectively replacing the agent's preference settings with those of the administrator.

In steps 404, 406, 408, and 410, the override module determines whether various system performance metrics are below a threshold, and if so, prompts the server to apply a server override in step 414. This helps to ensure that agent preferences do not adversely affect routing performance.

Referring again to steps 404, 406, 408, and 410, if the performance metrics are above their corresponding threshold, the agent preference is, according to one example, not overridden and, in step 412, may be accepted as expressed by the agent.

With respect to step 404, the override module may apply a server override to an agent preference setting if the agent's idle time is above a preset threshold. Idle time may be, for example, the amount of time that an eligible agent is inactive awaiting a next assignment. An agent may be idle if there are no activities in the customer activity queue that match the agent's assigned skills, skill levels and/or preference settings. According to some exemplary embodiments, a server override may be applied if the agent's occupancy rate is below a preset threshold. Occupancy rate may, for example, be calculated to be the total time the agent has spent on various activities divided by the total time the agent has been logged into the contact center as being eligible, during a certain time period. In some exemplary embodiments, the override module may be configured to predict an agent's idle time or occupancy rate should the agent preference setting be accepted, and apply a server override if the projected idle time exceeds a preset threshold and/or occupancy rate falls below a preset threshold. Determinations of current and future idle time and/or occupancy rate may be based on current and historical system data stored in the mass storage device 30.

With respect to step 406, the override module may apply a server override if the quality of the agent's actual performance on the preferred activity is below a preset threshold. The quality of the agent's performance may be measured by sampling inspection, such as listening to a recording of an agent call at random and evaluating the agent's interaction with the customer based on, for example, the agent's tone and language used during a customer interaction, the agent's management of the flow of a conversation in a prescribed manner, and the speed at which the agent resolved the customer issue. The sampling inspection may also be performed in real time. Performance quality may further be affected by customer satisfaction surveys. In some exemplary embodiments, performance quality data may be stored at the statistics server and numerically represented, for example, via a numeric scale ranging from one through ten, or represented by descriptive terms such as "poor," "good," or "excellent," "satisfactory," or "unsatisfactory," or the like.

In one illustrative example of the operation of step 408, an agent who wants to attain more experience in handling incoming mortgage related calls may indicate a preference for such an activity type. The agent's previous performance handling a similar activity, however, may have been deemed to be unacceptably poor (perhaps because he/she had never received any formal training on this type of customer action). The routing server 20 may thus apply a sever override and ignore this particular agent preference setting. The agent may be able to overcome the server override by obtaining formal training on handling such an activity and/or convincing the administrator to modify the agent's skill and skill level settings to increase the likelihood of being assigned to such a customer action in the future.

With respect to step 408, the override module may apply a server override if assigning an activity to the agent according to his/her preference would lead to starvation of other agents whose administrative settings lead to them to be assigned exclusively (or substantially exclusively) to that particular activity. An agent may be deemed to be in starvation if, for example, the agent remains idle beyond a preset period of time.

With respect to step 410, the override module may apply a server override if a service level on a non-preferred activity falls below a preset threshold. In an effort to optimally balance system capacity (e.g. availability of skilled agents) and cost, contact centers often set a service level target. For example, the contact center may have a service level target of keeping incoming calls on hold for not more than a particular amount of time (e.g. 30 seconds). Furthermore, a particular service level may be prescribed as a result of an existing customer service level agreement. In this regard, the override module may be configured to assign an agent to a particular activity despite the agent's preference to the contrary to help ensure that service level requirements associated with that particular activity are met.

Figure 5:
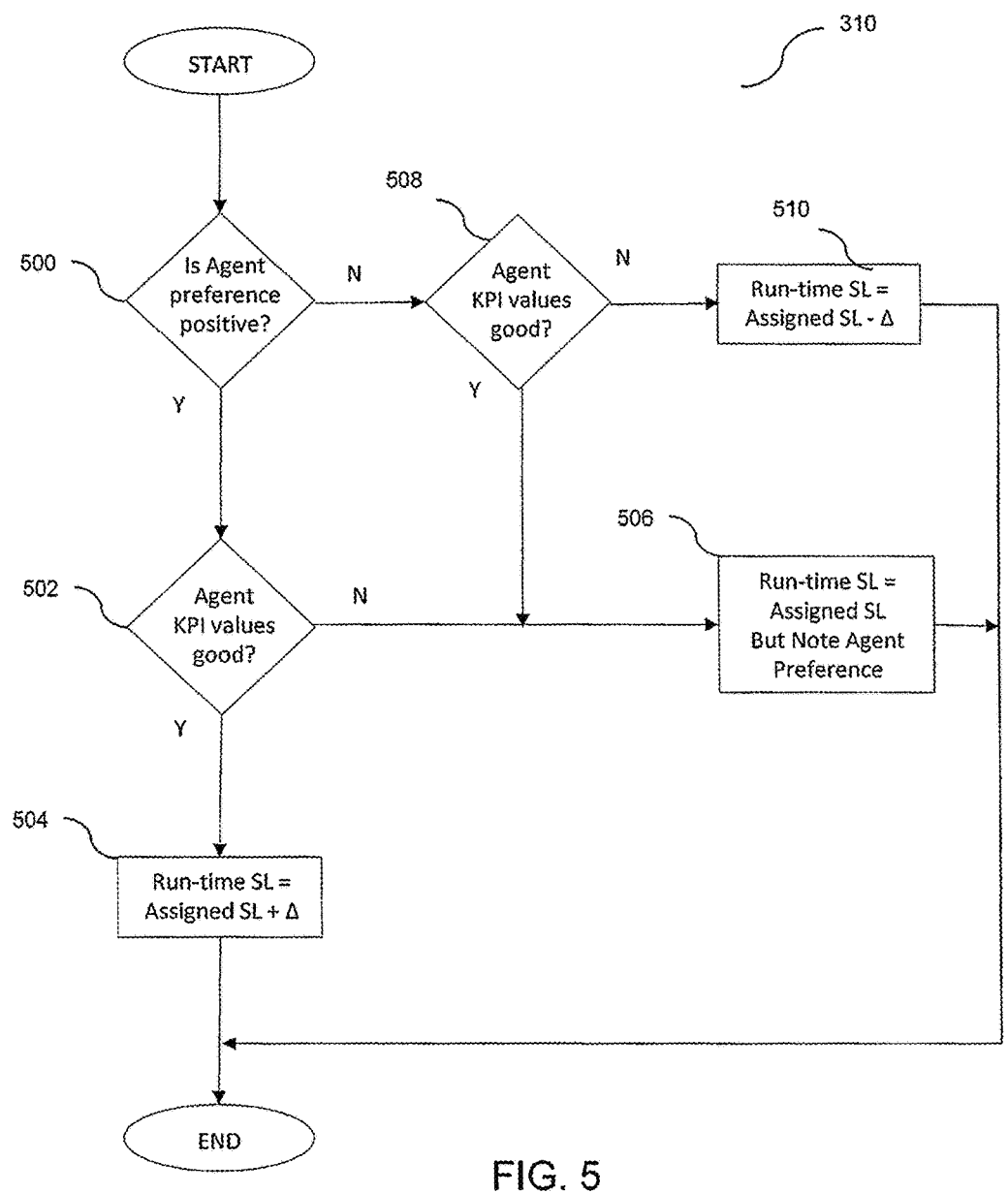
FIG. 5 is a flow diagram of a process for setting an agent's run-time skill, according to some exemplary embodiments.

FIG. 5 is a more detailed flow diagram of step 310 of FIG. 3 for setting an agent's run-time skill level, according to some exemplary embodiments. For simplicity purposes in describing the steps of FIG. 5, it is assumed that an agent's skill level for the skill associated with a customer activity (e.g. activity A) is expressed numerically (e.g. as an integer between one and ten). Furthermore, the agent is assumed to have knowledge of existing activities by, for example, being able to preview information about the pending customer activities in the customer activity queue. Also for simplicity purposes, in describing the steps of FIG. 5, the agent's preference for activity A, however expressed (whether numerically or otherwise), is interpreted as either "positive" or "negative." A person of skill in the art will understand, however, that an agent may express a degree of positive or negative preference and modification to the process of FIG. 5 will be apparent to the person of skill in the art to take into account the varying degrees of preference.

Also, while the process outlined in FIG. 5 is integrated into the process of FIG. 3, this, or a similar process, may be independently initiated after a triggering event such as, for example, a new customer activity being placed in an inbound queue, an agent updating his/her preference setting, or the like.

According to some embodiments, the routing server 20 uses an agent's key performance indicator (KPI) values, as retrieved from the mass storage device 30, to determine how an administratively set agent skill level is to be combined with the agent's preferences to arrive at a particular run-time agent skill level. Once set, the run-time skill level may be applied by a routing algorithm to route a customer activity to an appropriate agent. Agent KPIs, which are often used to assess the performance of contact center agents, may include, without limitation, average activity handling time (e.g. the average amount of time it takes an agent to service a particular activity), customer satisfaction data (e.g. based on customer feedback surveys), and depending on the nature of business supported by the contact center, the amount of revenue that is generated by the agent in a predefined period of time.

In step 500, the routing server 20 determines whether or not the agent's preference for activity A is positive. If positive, in step 502, the routing server 20 determines whether or not the agent's KPI values are "good," "acceptable," "high," or the like. An agent's KPI values may be deemed to be "good" if, for example, they meet or exceed respective preset performance thresholds. If KPI values are good, in step 504, the routing server 20 assigns a value to the agent's run-time skill level that is, for example, higher than the agent's administratively assigned skill level by a predefined amount (A). However, if KPI values are not good or are "unacceptable," "low," or the like, the routing server 20 assigns, in step 506, a value to the agent's run-time skill level that is, for example, the same as the agent's administratively assigned skill level, effectively ignoring the agent's preference. In some situations, this may be a desirable outcome because even though the agent has expressed an interest in handling the activity, the agent's performance, for example, has historically been poor; thus, it may not be appropriate to further increase the likelihood of the agent servicing such activities. The agent's preference may, however, be later considered in the routing server's 20 routing strategy during the actual process of assigning agents to activities.

Referring again to step 500, if the agent's preference is not "positive" (e.g. "negative,") the routing server assesses, in step 508, the agent's KPI values. If the values are good, the routing server 20 proceeds to ignore the agent's preference according to step 506. However, if the agent's KPI values are not good, the routing server 20 assigns a value to the agent's run-time skill level that is, for example, lower than the agent's administratively assigned skill level by a predefined amount (A), according to step 510.

Those of skill in the art will recognize that while the process 310 of FIG. 5 uses an agent's KPI values to balance against his/her preferences, the process may be adapted to instead, or in addition, consider contact center KPI values as retrieved from the mass storage device 30 or any other performance metric conventional in the art. Contact center KPIs, which are often used to assess effectiveness of contact center operations, may include service level agreements (SLA) on maximum wait time, customer satisfaction, contact center business results (e.g. measured by the amount of revenue generated by the contact center in a given period of time), and operational parameters such as agent occupancy, average talk time, abandonment rate, and the like.

Those of skill in the art will also recognize that while, according to some embodiments, the administrative settings and the preference settings are merged into a single variable (e.g. the run-time skill level) used later by the routing algorithm, according to other exemplary embodiments, the two settings may be kept separate and applied as two separate and independent variables. Also, those skilled in the art will recognize that while the exemplary process of FIG. 5 applies to an agent preference for a particular activity, the process may easily be adapted to account for agent preferences for skill types, service types, media types, client types, and/or other system parameters that are associated with the particular customer activity. Those of skill in the art will also recognize that the process of FIG. 5 may be modified to adapt to agent preferences with regards to capacity, potentially at an activity level.

Figure 6A:
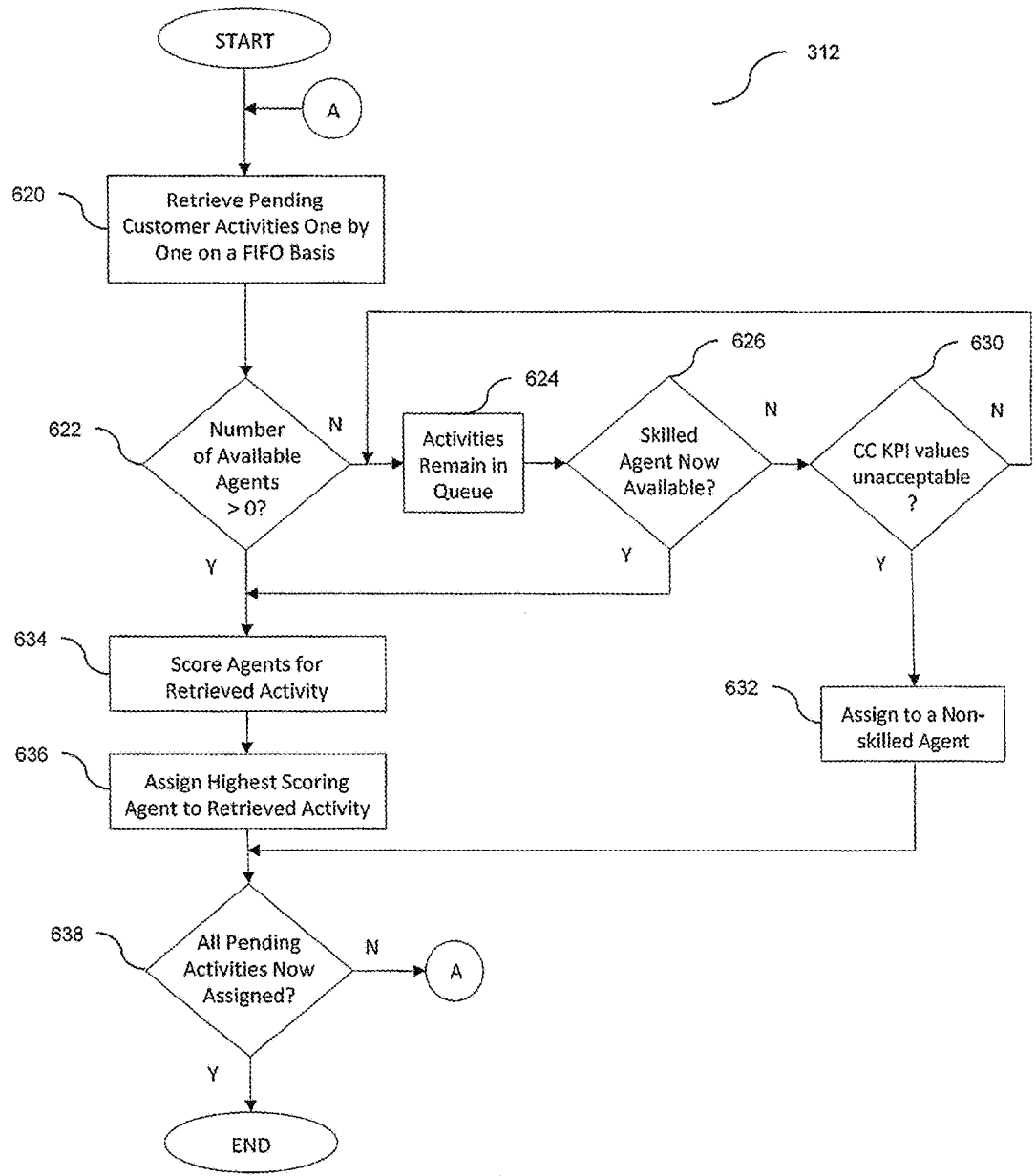
FIG. 6a is a flow diagram of a process for mapping available agents to queued customer activities, according to some exemplary embodiments.

FIG. 6a is a more detailed flow diagram of step 312 of FIG. 3 for mapping available agents to queued customer activities, according to some embodiments of the invention. For simplicity purposes in describing the steps of FIG. 6a, it is assumed that an agent's preferences with regards to particular activities are merged with the administrative settings for skill level according to the process 310 of FIG. 5 to arrive at a run-time agent skill level.

According to some exemplary embodiments, an agent's preference with regards to capacity for handling such activities is merged with the administratively assigned capacity using a process similar to that of FIG. 5 to arrive at a run-time capacity setting.

The process starts, and in step 620, the routing server 20 retrieves a pending customer activity (e.g. activity A) from the customer activity queue. The activities may be retrieved, for example, sequentially on a first-in-first-out (FIFO) basis. The set of skills associated with activity A, as established in step 204 of FIG. 2a, will henceforth be referred to as skill set A.

In step 622, the routing server 20 queries a list of eligible agents from the statistics server 22, and proceeds to identify the number of available (or soon to be available) agents, C, who, as recognized in step 306 of FIG. 3, have been administratively assigned to skill set A and who have not exceeded (or will soon not exceed) their capacity for handling activities associated with Service A and medium A. If any agents are identified, the routing server 20 proceeds to step 634. However, if no such agents are found, the routing server 20, in step 624, maintains the retrieved activity from step 620 in the customer activity queue until agents become available.

In this regard, in step 626, after a certain amount of time elapses, the routing server 20 checks whether an available agent may be found. If so, the routing server 20 proceeds to step 634. Otherwise, in step 630, the routing server 20 determines whether contact center KPI values have dropped below acceptable levels. If not, activities remain in queues according to step 624. Otherwise, in step 632, the retrieved activity may be assigned to an eligible agent who does not possess skill set A. According to some aspects, this agent may be an eligible agent with the highest idle time, lowest occupancy rate, or the like. Of course, there are certain activities that are not suitable for being assigned to a non-skilled agents, and those activities remain, for example, in the queue but with, for example, elevated priorities.

In step 634, the routing server 20 assigns a score that is based, for example, on the agent's run-time skill level for skill A. For example, in some embodiments, a score may incrementally increase with increasing effective agent skill level, and receive an additional boost if effective skill level reaches or surpasses the desired skill level for Skill A, as determined in step 204 of FIG. 2a. The score boost may be adjusted to ensure compliance with service level requirements. According to some exemplary embodiments, in step 634, if two or more agents have the same score, the routing server 20 may adjust the scores of the two or more agents up or down based on their preferences for the retrieved activity (or any associated preference setting) and/or the agents' KPI values. This adjustment may be performed to help ensure that no two agents have the same score.

Once a score has been assigned to each agent, in step 636, the routing server 20 may assign the highest scoring agent to the retrieved activity.

In step 638, the routing server determines whether any activities remain in the customer activity queue for being assigned to an agent. If not all activities have been assigned, and the process returns to step 620 for assigning the remaining activities to an agent.

A person of ordinary skill in the art will recognize that while the agent preferences may, according to one example, indirectly affects agent scores and agent assignments, in some embodiments, the process 312 of FIG. 6a may be modified to treat agent preferences as independent parameters that can directly affect the scoring process and the resulting agent assignment.

Figure 6B:
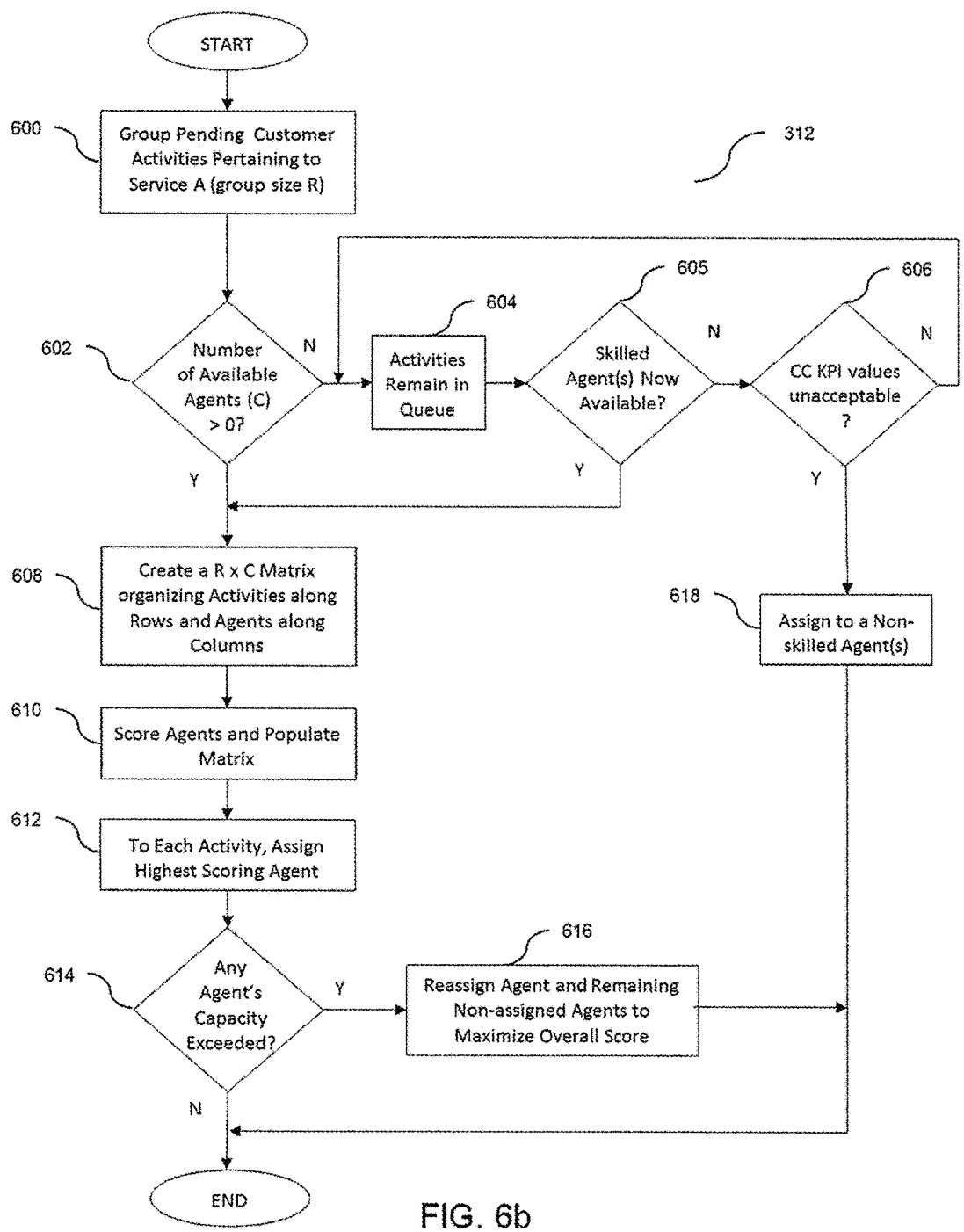
FIG. 6b is a flow diagram of a process for mapping available agents to queued customer activities, according to some exemplary embodiments.

FIG. 6b is a more detailed flow diagram of step 312 of FIG. 3 for mapping available agents to queued customer activities, according to another example embodiment that considers a group of activities and a group of agents for matching, instead of considering each individual activity sequentially. For simplicity purposes in describing the steps of FIG. 6b, it is assumed that an agent's preferences with regards to particular activities are merged with the administrative settings for skill level according to the process 310 of FIG. 5, to arrive at a run-time agent skill level.

According to some embodiments, an agent's preference with regards to capacity for handling such activities may also be merged with the administratively assigned capacity using a process similar to that of FIG. 5 to arrive at a run-time capacity setting.

The process starts, and in step 600, the routing server 20 may form a group (e.g. group A) of all pending customer activities that pertain to the same service type (e.g. service A) and media type (e.g. medium A), as determined by step 204 of FIG. 2a. Service A may, for example, correspond to several skills (e.g. skill set A) as established in step 204. The number of customer activities in this group is hereinafter represented with R.

In step 602, the routing server 20 queries a list of eligible agents from the statistics server 22, and proceeds to identify the number of available (or soon to be available) agents, C, who, as identified in step 306 of FIG. 3, have been administratively assigned to skill set A and who have not exceeded (or will soon not exceed) their capacity for handling activities associated with Service A and medium A. If one or more agents are identified, the routing server 20 proceeds to step 608. However, if no such agents are found, the routing server 20, in step 604, maintains the activities of group A in the customer activity queue until agents become available.

In this regard, in step 605, after a certain amount of time elapses, the routing server 20 checks whether one or more available agents may be found. If so, the routing server 20 proceeds to step 608. Otherwise, in step 606, the routing server 20 determines whether contact center KPI values have dropped below acceptable levels. If not, activities remain in queues according to step 604. Otherwise, according to some exemplary embodiments, in step 618, the queued group of activities may be assigned to one or more agents who do not possess the skill set A, but who have the capacity to handle the media type associated with Activity A, as established in step 204 of FIG. 2*a*. In such an event, the activities may be assigned to agents in the order that the activities arrived. Of course, there are certain activities that are not suitable for being assigned to a non-skilled agents, and those activities remain, for example, in the queue but with, for example, elevated priorities. In other aspects (not shown in FIG. 6*b*), the routing server 20 may assign non-skilled agents to the queued activities until KPI values return to acceptable levels at which time, no more non-skilled agents are assigned to the activities of group A and the routing server 20 returns to step 604 and maintains the non-assigned activities from group A in a queue.

Referring again to step 602, if there are available agents to whom the pending activities may be routed, the routing server 20, in step 608, formulates what may be visualized as a matrix with rows representing each of R activities in group A, columns representing each of C identified agents, and matrix elements acting as placeholders for scores assigned to each agent-activity pair.

In step 610, for each agent-activity pair, the routing server 20 assigns a score that is based, for example, on the agent's run-time skill level for skill A. For example, in some embodiments, a score may incrementally increase with increasing effective agent skill level, and receive an additional boost if effective skill level reaches or surpasses the desired skill level for Skill A, as determined in step 204 of FIG. 2*a*. The score boost may be adjusted to ensure compliance with service level requirements. According to some exemplary embodiments, in step 610, if two or more agents have the same score, the routing server 20 may adjust the scores of the two or more agents up or down based on their preferences for the retrieved activity (or any associated preference) and/or the agents' KPI values. This adjustment may be performed to help ensure that no two agents have the same score.

Once a score has been assigned to each agent-activity pair, in step 612, the routing server 20 may assign the highest scoring agent to each activity.

In step 614, the routing server 20 checks whether any agent has been assigned to two or more tasks, and if so, whether the assignments exceed the agent's corresponding media capacity or capacity for service A. If the agent's effective capacity has been exceeded, in step 616, the routing server 20 assigns the agent and any other of the C agents, who are not assigned to any activity, to the two or more activities so as to maximize, for example, the summation of the scores of the agents assigned to those activities. This step may be repeated for other agents who have exceeded their effective capacities as a result of the assignments in step 612.

A person of ordinary skill in the art will recognize that while the agent preferences may, according to one example, only indirectly affect agent scores and agent assignments, in other aspects, the process 312 of FIG. 6*b* may be modified to treat agent preferences as independent parameters that can directly affect the scoring process and the resulting agent assignments.

Figure 6C:
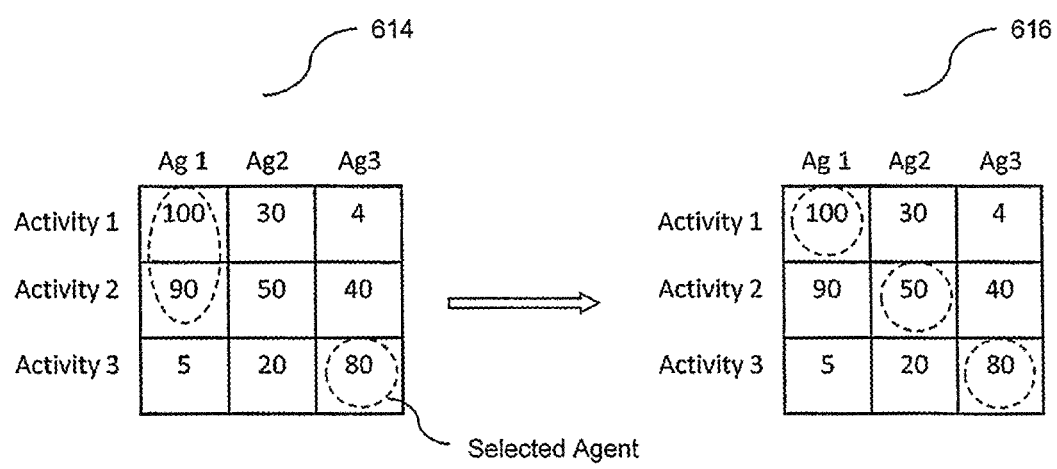
FIG. 6c is a diagram depicting the process of agent assignment based on the maximization of total agents' score technique, according to some exemplary embodiments.

FIG. 6*c* is a simplified visualization of the process captured in steps 612 through 616 according to some exemplary embodiments.

For purposes of simplicity in illustration, it is assumed that only three activities (e.g. Activity 1, Activity 2, and Activity 3) and three agents (e.g. Ag1, Ag2, and Ag3) are available, none of whom have the capacity to handle more than one activity. As a result of the assignment in step 612 of FIG. 6*b*, Ag1 has been assigned to Activities 1 and 2, while Ag2 has not been assigned to any activity. Step 616, reassigns Ag1 and Ag2 to Activities 1 and 2. Two possible assignments exist: i) assign Ag1 to Activity 1 and Ag2 to Activity 2; or ii) assign Ag1 to Activity 2 and Ag2 to Activity 1. The former will produce a sum score of 150 while the latter will yield a sum score of 120. As such, the former assignment is the better choice and is the solution adopted by step 616.

FIG. 7 is a conceptual layout diagram of an exemplary graphical user interface 702 displayed by an agent device 38 for viewing and editing agent preference information according to some exemplary embodiments of the invention. An agent may retrieve his current preference settings from an agent preference record which may be stored in the mass storage device and indexed, for example, according to agent ID information. The retrieved record is displayed on the agent device 38. The agent may select one or more displayed settings for editing. The editing of one or more settings may alter selection of the agent for activities that are currently queued and pending to be assigned.

According to the illustrated example, an agent may be able to set/edit preferences with regards to one or more media types as, for example, illustrated by the drop down menu 704, and one or more service types. Further, the agent may be able to indicate his/her preferred capacity for handling incoming and/or outgoing activities associated with a particular media type and/or service type for a specified period of time. According to some exemplary embodiments (not shown in FIG. 7), an agent may be able to view all pending activities in the incoming and/or outgoing activity queue through a graphical user interface and express a preference for the activities by, for example, ranking activities in order of preference, or indicating a positive or negative preference for some or all of the activities, or the like.

Selection of a "save" option after entering the various agent preferences causes update of the associated agent preference record which, according to some embodiments, is retrieved for making a routing decision for one or more queued activities.

As exemplified with respect to FIG. 6*b*, according to some embodiments, routing logic is applied concurrently to a set of activities waiting in queue instead of sequentially to individual activities. According to these exemplary embodiments, activities are routed to a pool of agents. Agents are included in the pool if they are currently available or predicted to become available in-time for handling at least one of the activities. Each activity of the given set may, for example, have a target handling time given by the SLA. Also, the routing may be for any type of activity including real-time activities (e.g. voice, video, or chat), and deferred activities (e.g. email or letter responses).

According to some exemplary embodiments, for each activity waiting in queue a customer preference ranking for best match to agents in the pool is composed. The customer preference can include criteria such as service type, requested skills, and SLA, as well as advanced criteria such as, for example, the customer's previous satisfaction ratings or other assumed personal preferences.

According to some exemplary embodiments, for each agent in the pool, an agent preference ranking for best match to activities waiting in queue is also composed. The agent preference can include criteria such as skills and predicted agent's availability, as well as advanced criteria such as the agent's up-sell/cross-sell ability or agent's individual preferences.

According to exemplary embodiments, agent declare (statically and/or dynamically) their preferences regarding task/activity assignments, for example by assigning their individual preference levels to all activity types/categories and media types/channels the given contact center is dealing with. These preference rankings may be dynamically changed by the agent. Individual preferences may also be expanded to capacity settings towards higher or lower values or adjustment of media mixes.

According to exemplary embodiments, based on both customer and agent preferences, a best match between the set of activities and the set of agents is determined, and the activities are routed accordingly.

According to exemplary embodiments, for each activity in the queue, the customer preference values with respect to agents available in the pool are determined. Also, for each agent in the pool, the agent preference values with respect to activities waiting in queue are determined. The routing server then applies an appropriate algorithm to find a best match between activities in the queue and the agents in the pool. One example for such an algorithm is Gale-Shapley matching which takes into account individual preferences from both sides.

According to some embodiments, the Gale-Shapley algorithm is applied to optimize the match from the customers' perspectives.

According to some embodiments, the Gale-Shapley algorithm is applied to optimize the match from the agents' perspectives.

According to some embodiments, the Gale-Shapley algorithm is adjusted to accommodate for either agent surplus or activity surplus (making the groups uneven in numbers); and/or time dimension (e.g. activities may have SLA requirements while agents may have predicted remaining busy time). In some examples, equal number of agents and activities may be achieved through pre-filtering the group of agents or activities to remove any agent surplus or activity surplus, as the case may be. Pre-filtering may be based on a number of considerations including agent skills, agent idle-time, or the like.

Another example of a matching algorithm for matching a group of agents to a group of activities is a reverse auction algorithm as described in Dimitri P. Bertsekas & David A. Castanon, "A Forward/Reverse Auction Algorithm for Asymmetric Assignment Problems," Computational Optimization and Applications, 1, 277-297 (1992) (unpublished copy is also available at http://citeseerx.ist.psu.edu/viewdoc/summary?doi=10.1.1.28.8367), the content of which is incorporated herein by reference. For simplification purposes, both customers' and agents' preferences are merged into a routing matrix where the matrix includes the ranks (scores) that are assigned to each pair (activity-in-the-queue, ready-agent). The ranks may depend on well-known factors such as agent skills and activity types as well as agent preferences and service capacities. A routing algorithm is then employed to maximize some ranking criteria.

According to some embodiments, an activity preference table is generated based on "hard" or rigid criteria for best matching, such as service type, customer segment/tier, customer satisfaction feedback, agent skills, activity schedule, and the like. An agent preference table is also composed based on agent preferences, which may be deemed as a "soft" or flexible criteria which may be deemed to be of a lower priority.

According to some exemplary embodiments, the Gale-Shapley matching is performed with activities being in a "proposing" role, and agents being in an "accepting" role. This leads to a best match from the perspective of the activities by giving priority to the activity preferences, while agent preferences may be secondary and are matched with best effort if possible.

In the case of an equal number of agents and activities, the Gale-Shapley algorithm may be performed to optimize the match from the activities' perspective as follows:

Each activity "proposes" to its first ranked choice. Each agent keeps his/her top-ranked activity but defers accepting the proposal. Each agent also rejects his/her lower ranked activities. Each rejected activity proposes to its second ranked choice. Each agent rejects again any lower-ranked activities, which may include previous activities that have now become lower-ranked. The process repeats until no further proposals are made; each agent then accepts his/her top-ranked activity and the matches are made.

According to other exemplary embodiments, the Gale-Shapley matching is performed with agents being in a "proposing" role, and activities being in an "accepting" role. This leads to a best match from the perspective of the agents by giving priority to the agent preferences, while activity preferences may be secondary and are matched with best effort if possible.

Table I provides exemplary values in activity/interaction preference (I-preference) and agent preference (A-preference) tables.

TABLE I

|  | A1 | A2 | A3 | A4 | A5 |
|---|---|---|---|---|---|
| I1 | 3 | 5 | 2 | 1 | 1 |
| I2 | 4 | 3 | 1 | 5 | 2 |
| I3 | 1 | 3 | 5 | 4 | 2 |
| I4 | 4 | 2 | 1 | 3 | 5 |
| I5 | 3 | 4 | 2 | 1 | 5 |
| I-Preferences | | | | | |

|  | I1 | I2 | I3 | I4 | I5 |
|---|---|---|---|---|---|
| A1 | 2 | 3 | 5 | 4 | 1 |
| A2 | 5 | 1 | 2 | 3 | 4 |
| A3 | 2 | 4 | 5 | 3 | 1 |
| A4 | 3 | 1 | 4 | 2 | 5 |
| A5 | 3 | 1 | 4 | 5 | 2 |
| A-Preferences | | | | | |

According to the above example, the optimal match [I, A] that maximizes the preference of activities in the activity preference table is {3, 5, 1, 2, 4}, while the optimal match [A, I] that maximizes the preference of activities in the agent preference table is {1, 3, 5, 4, 2}.

FIG. 9A provides a visualization of the optimal matches [I, A] and [A, I] from the perspective of the activities and agents, respectively. The highlighted cells below represent the matching performed with activities being in a proposing role (left table) and agents being in such a role (right table). The numbers in each highlighted cell of the left and right tables are formatted to represent the I-Preference/A-Preference and A-Preference/I-Preference, respectively, of each of the finalized matches. As is visually apparent, the Gale-Shapley algorithm yields different matching results depending on whether activities or agents are in the proposing role (i.e. having higher priority afforded to their preferences).

Table III and FIG. 9B provide a further example of the Gale-Shapley algorithm being applied to a set of eight agents and eight activities/interactions. Table III provides exemplary values in activity/interaction preference (I-preference) and agent preference (A-preference) tables.

TABLE III

|    | A1 | A2 | A3 | A4 | A5 | A6 | A7 | A8 |
|----|----|----|----|----|----|----|----|----|
| I1 | 3  | 4  | 8  | 7  | 1  | 5  | 2  | 6  |
| I2 | 6  | 1  | 2  | 5  | 4  | 8  | 3  | 7  |
| I3 | 3  | 6  | 7  | 4  | 2  | 5  | 8  | 1  |
| I4 | 5  | 2  | 1  | 4  | 8  | 6  | 3  | 7  |
| I5 | 4  | 2  | 5  | 8  | 3  | 6  | 1  | 7  |
| I6 | 1  | 7  | 8  | 6  | 4  | 2  | 3  | 5  |
| I7 | 8  | 1  | 5  | 6  | 2  | 4  | 3  | 7  |
| I8 | 8  | 6  | 1  | 3  | 4  | 7  | 5  | 2  |

I-Preferences

|    | I1 | I2 | I3 | I4 | I5 | I6 | I7 | I8 |
|----|----|----|----|----|----|----|----|----|
| A1 | 5  | 6  | 2  | 8  | 1  | 4  | 3  | 7  |
| A2 | 7  | 6  | 3  | 8  | 4  | 2  | 5  | 1  |
| A3 | 1  | 4  | 8  | 5  | 2  | 3  | 7  | 6  |
| A4 | 6  | 4  | 3  | 5  | 7  | 8  | 2  | 1  |
| A5 | 6  | 7  | 4  | 2  | 8  | 1  | 3  | 5  |
| A6 | 8  | 1  | 4  | 5  | 3  | 6  | 7  | 2  |
| A7 | 4  | 3  | 8  | 7  | 2  | 6  | 1  | 5  |
| A8 | 3  | 5  | 6  | 2  | 4  | 7  | 1  | 8  |

A-Preferences

According to the above example, the optimal match [I, A] that maximizes the preference of activities in the activity preference table is {5, 3, 8, 6, 7, 1, 2, 4}, while the optimal match [A, I] that maximizes the preference of activities in the agent preference table is {5, 3, 1, 8, 6, 2, 7, 4}.

FIG. 9B provides a visualization of the optimal matches [I, A] and [A, I] from the perspective of the activities and agents, respectively.

According to some exemplary embodiments, auction matching may be performed by placing the activities in the role of bidders and agents in the role of objects being bid on. Initially, each agent is assigned a "price." At every iteration of the algorithm, one or more activities bid simultaneously for their "most preferred" agent, thereby incrementally raising the corresponding prices. Agents are then assigned to the highest bidder. The bidding increments are at least equal to a positive parameter E. For better results, the algorithm may be applied several times, starting with a large value for E and successively reducing E down to a final preset value, with each scaling phase providing the initial prices for the successive iteration. Agents can exert their preferences for activities by lowering their prices to a level that is sufficiently low to lure a preferred activity away from the agent that it is currently assigned to. In other exemplary embodiments, the role of the activity and agent may be reversed.

Figure 8:
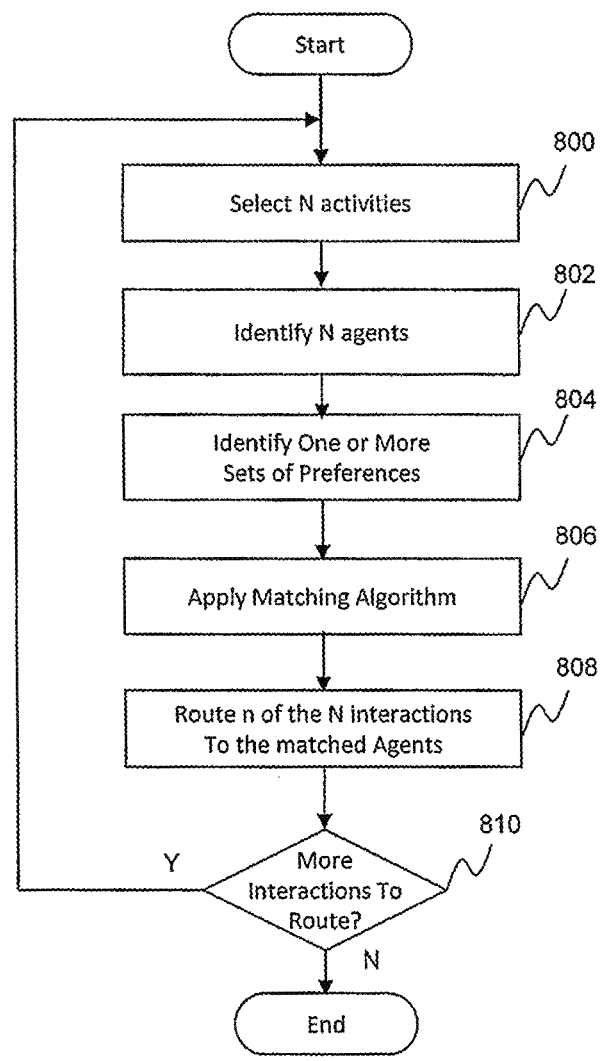
FIG. 8 is a flow diagram of a process for matching a group of activities to a group of agents for routing according to some exemplary embodiments.

FIG. 8 is a flow diagram of a process for matching a group of activities to a group of agents for routing according to some exemplary embodiments.

The process starts, and in step 800, the routing server 20 concurrently selects N interactions/activities from the activity queue, where N>1.

In step 802, the routing server concurrently identifies N eligible agents.

In step 804, the routing server identifies one or more sets of preferences, such as, for example, customer preferences associated with the activities, agent preferences, merged customer/agent preferences, or the like. According to one example, the routing server or some other server composes one or more preference tables for the activities and/or agents, such as, for example, the tables of Table I. Of course, the preference tables may be generated ahead of time, in which case the routing server may simply retrieve the generated preference tables for identifying the customer and agent preferences.

In step 806, the routing server applies a matching algorithm to match the N activities to the N agents based on the one or more preference tables. The matching algorithm may be based, for example, on the Gale-Shapley matching algorithm.

In step 808, the routing server routes n of the N activities to the matched agents, where n<=N.

In step 810, a determination is made as to whether there are any other activities, including those that were not routed in step 808, that still need to be routed. If so, the process returns to step 800 for routing these other activities.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for routing a plurality of activities to a plurality of contact center agents, the method comprising:
    concurrently selecting, by a processor, N activities, wherein N is an integer greater than 1;
    concurrently identifying, by the processor, N contact center agents;
    identifying, by the processor, one or more sets of preferences associated with the N activities, wherein the one or more sets of preferences include a value for each activity-agent pair, wherein each activity-agent pair is selected from the N activities and the N contact center agents, wherein the value of a particular activity-agent pair is indicative of a level of preference of the activity in the particular activity-agent pair, for being routed to the agent in the particular activity-agent pair;
    matching, by the processor, the N activities and the N contact center agents based on the one or more sets of preferences, wherein the matching is configured to optimize the one or more sets of preferences, the matching including:
        transmitting by each of the N activities, a proposal to its top ranked agent of the N contact center agents;
        determining that each agent receiving the proposal has kept the activity transmitting the proposal, in response to the activity being a top-ranked activity by the receiving agent; and
        determining that each agent receiving the proposal has rejected the activity transmitting the proposal, in response to the activity being an activity other than the top ranked activity; and
    routing, by the processor, at least one of the N activities to a corresponding one of the matched contact center agents.

2. The method of claim 1, wherein the one or more sets of preferences are further associated with the contact center agents, wherein the one or more sets of preferences further identify agent skills, predicted agent availability, agent upsell ability, agent cross-sell ability, or individual agent preferences.

3. The method of claim 1, wherein the one or more sets of preferences associated with the activities identify service type, skill set, service level agreement, or customer satisfaction.

4. The method of claim 1, wherein the matching is based on the Gale-Shapley algorithm.

5. The method of claim 1 further comprising assigning priority to the one or more sets of preferences associated with the N activities.

6. The method of claim 2 further comprising assigning priority to the one or more set of preferences associated with the N agents.

7. The method of claim 2, wherein the N contact center agents are selected from a group of M eligible agents, wherein M is an integer greater than N.

8. The method of claim 1, wherein the N activities are selected from a group of M pending activities, wherein M is an integer greater than N.

9. A server for routing a plurality of activities to a plurality of contact center agents, the server including:
a processor; and
a memory, wherein the memory has stored thereon instructions that, when executed by the processor, cause the processor to:
concurrently select N activities, wherein N is an integer greater than 1;
concurrently identify N contact center agents;
identify one or more sets of preferences associated with the N activities, wherein the one or more sets of preferences include a value for each activity-agent pair, wherein each activity-agent pair is selected from the N activities and the N contact center agents, wherein the value of a particular activity-agent pair is indicative of a level of preference of the activity in the particular activity-agent pair, for being routed to the agent in the particular activity-agent pair;
match the N activities and the N contact center agents based on the one or more sets of preferences, wherein the matching is configured to optimize the one or more sets of preferences, wherein the instructions that cause the processor to match the N activities and the N contact center agents include instructions that cause the processor to:
transmit, by each of the N activities, a proposal to its top ranked agent of the N contact center agents;
determine that each agent receiving the proposal has kept the activity transmitting the proposal, in response to the activity being a top-ranked activity by the receiving agent; and
determine that each agent receiving the proposal has rejected the activity transmitting the proposal, in response to the activity being an activity other than the top ranked activity; and
route at least one of the N activities to a corresponding one of the matched contact center agents.

10. The server of claim 9, wherein the one or more sets of preferences are further associated with the contact center agents, wherein the one or more sets of preferences further identify agent skills, predicted agent availability, agent upsell ability, agent cross-sell ability, or individual agent preferences.

11. The server of claim 9, wherein the one or more sets of preferences associated with the activities identify service type, skill set, service level agreement, or customer satisfaction.

12. The server of claim 9, wherein the matching is based on the Gale-Shapley algorithm.

13. The server of claim 9, wherein the instructions further cause the processor to assign priority to the one or more sets of preferences associated with the N activities.

14. The server of claim 10, wherein the instructions further cause the processor to assign priority to the one or more set of preferences associated with the N agents.

15. The server of claim 10, wherein the N contact center agents are selected from a group of M eligible agents, wherein M is an integer greater than N.

16. The server of claim 9, wherein the N activities are selected from a group of M pending activities, wherein M is an integer greater than N.

17. A method for routing a plurality of activities to a plurality of contact center agents, the method comprising:
concurrently selecting, by a processor, N activities, wherein N is an integer greater than 1;
concurrently identifying, by the processor, N contact center agents;
identifying, by the processor, one or more sets of preferences associated with the N contact center agents, wherein the one or more sets of preferences include a value for each activity-agent pair, wherein each activity-agent pair is selected from the N activities and the N contact center agents, wherein the value of a particular activity-agent pair is indicative of a level of preference of the contact center agent in the particular activity-agent pair, for having the activity routed to the contact center agent in the particular activity-agent pair;
matching, by the processor, the N activities and the N contact center agents based on the one or more sets of preferences, wherein the matching is configured to optimize the one or more sets of preferences, wherein the matching of the N activities and the N contact center agents includes:
transmitting by each of the N contact center agents, a proposal to its top ranked activity of the N activities;
determining that each activity receiving the proposal has kept the contact center agent transmitting the proposal, in response to the contact center agent being a top-ranked agent for the receiving activity; and
determining that each activity receiving the proposal has rejected the contact center agent transmitting the proposal, in response to the contact center agent being an agent other than the top ranked agent; and
routing, by the processor, at least one of the N activities to a corresponding one of the matched contact center agents.

18. A server for routing a plurality of activities to a plurality of contact center agents, the server comprising:
a processor; and
a memory, wherein the memory has stored thereon instructions that, when executed by the processor, cause the processor to:
concurrently select N activities, wherein N is an integer greater than 1;
concurrently identify N contact center agents;
identify one or more sets of preferences associated with the N activities, wherein the one or more sets of preferences include a value for each activity-agent pair, wherein each activity-agent pair is selected from the N activities and the N contact center agents, wherein the value of a particular activity-agent pair is indicative of a level of preference of the activity in the particular activity-agent pair, for being routed to the agent in the particular activity-agent pair;
match the N activities and the N contact center agents based on the one or more sets of preferences, wherein the matching is configured to optimize the one or more sets of preferences, wherein the instructions that cause the processor to match the N activities and the N contact center agents includes:
transmit by each of the N contact center agents, a proposal to its top ranked activity of the N activities;

determine that each activity receiving the proposal has kept the contact center agent transmitting the proposal, in response to the contact center agent being a top-ranked agent for the receiving activity; and determine that each activity receiving the proposal has rejected the contact center agent transmitting the proposal, in response to the contact center agent being an agent other than the top ranked agent; and route at least one of the N activities to a corresponding one of the matched contact center agents.

* * * * *